US008850223B1

(12) United States Patent
Helsel et al.

(10) Patent No.: US 8,850,223 B1
(45) Date of Patent: Sep. 30, 2014

(54) METHOD AND SYSTEM FOR HARD DISK EMULATION AND CRYPTOGRAPHIC ACCELERATION ON A BLADE SERVER

(75) Inventors: Brett Helsel, Woodinville, WA (US); Ryan C. Kearny, Kenmore, WA (US); Greg Davis, Spokane, WA (US); David D. Schmitt, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 1110 days.

(21) Appl. No.: 10/327,220

(22) Filed: Dec. 20, 2002

Related U.S. Application Data

(60) Provisional application No. 60/397,466, filed on Jul. 19, 2002.

(51) Int. Cl.
*G06F 21/00* (2013.01)
(52) U.S. Cl.
USPC .......................................... 713/189; 713/191
(58) Field of Classification Search
CPC ............ H04L 63/0281; H04L 63/0428; H04L 63/0471; H04L 69/163; H04L 69/16; H04L 63/0485; H04L 63/164
USPC .................................................. 713/189, 191
See application file for complete search history.

(56) References Cited

U.S. PATENT DOCUMENTS

| | | | | |
|---|---|---|---|---|
| 6,438,678 B1 * | 8/2002 | Cashman et al. | ................ | 712/34 |
| 6,708,273 B1 * | 3/2004 | Ober et al. | .................... | 713/189 |
| 6,959,007 B1 * | 10/2005 | Vogel et al. | ................... | 370/469 |
| 7,073,059 B2 * | 7/2006 | Worely et al. | ................. | 713/168 |
| 7,149,892 B2 * | 12/2006 | Freed et al. | .................... | 713/151 |
| 7,370,348 B1 * | 5/2008 | Patel et al. | ........................ | 726/5 |
| 7,516,333 B2 | 4/2009 | Yunis et al. | | |
| 2002/0146128 A1 * | 10/2002 | Mauro et al. | .................. | 380/270 |
| 2002/0194412 A1 * | 12/2002 | Bottom | ......................... | 710/302 |
| 2003/0110351 A1 * | 6/2003 | Blood et al. | .................. | 711/111 |

\* cited by examiner

*Primary Examiner* — David Garcia Cervetti
*Assistant Examiner* — Carlton Johnson
(74) *Attorney, Agent, or Firm* — John W. Branch; Lowe Graham Jones PLLC

(57) ABSTRACT

An inventive apparatus that integrates the operation of a hard disk emulator and a cryptographic accelerator on a single blade server card. An application with cryptographic operations can off load computationally intensive calculations to the cryptographic accelerator so that the speed at which the application performs actions can be increased significantly. Typically, the hard disk emulator is a flash memory component and the accelerator can perform at least modular exponentiation calculations. One bus is employed for communication between the hard disk emulator and the accelerator. Another bus is employed to communicate with other resources off the card. Often, the card is configured to operate as one of a several blade servers in a chassis.

23 Claims, 5 Drawing Sheets

METHOD AND SYSTEM FOR HARD DISK EMULATION AND CRYPTOGRAPHIC ACCELERATION ON A BLADE SERVER

RELATED APPLICATION

This utility application is related to a previously filed U.S. Provisional Application Ser. No. 60/387,466, filed Jul. 19, 2002, the benefit of the earlier filing date of which is hereby claimed under 35 U.S.C. §119 (e).

FIELD OF THE INVENTION

The present invention relates to provisioning computing resources on a card, and more particularly to integrating hard disk emulation and acceleration of cryptographic functions in a card.

BACKGROUND OF THE INVENTION

A Blade Server is a type of computing system that allows a user to provision server or other computing resources on an individual card, or "blade". These blades are housed together with shared resources such as power supplies and cooling fans in a chassis, creating a high-density system with a modular architecture that provides improved flexibility and scalability. Blade Servers can enable the operation of multiple servers in a relatively small footprint, reduce rack complexity, simplify cabling and reduce energy consumption. Blade Servers are often employed in space-constrained and energy conscious environments such as data centers and Internet Service Providers (ISPs).

Physically, a typical Blade Server is a relatively thin, modular electronic circuit board or card, containing one, two, or more processors and memory, which can be inserted into a space-saving chassis with many similar Blade Servers. Typically, each Blade Server will be configured to process a single, dedicated application (such as serving Web pages). In the chassis, each Blade Server will typically share a common high-speed bus such as a Peripheral Component Interconnect (PCI) bus or an Integrated Device Electronics (IDE) bus.

Many applications that serve up Web pages use the Secure Sockets Layer and Transport Layer Security (SSL/TLS) protocols to achieve end-to-end secure communications, particularly in the areas of electronic commerce and financial services. The SSL protocol is described in Netscape Communications Corp, Secure Sockets Layer (SSL) version 3, http://home.netscape.com/eng/ssl3/(November 1996). The TLS protocol is described in Dierks, T., and Allen, C., "The TLS Protocol Version 1.0," RFC 2246 (January 1999). The most widely used SSL/TLS-enabled protocol today is the Hypertext Transport Protocol (HTTP) encapsulated in an SSL/TLS connection, commonly known as HTTPS. The HTTP protocol is described in "Hypertext Transport Protocol (HTTP) version 1.0, RFC 1945 (May 1996)" and "Hypertext Transport Protocol (HTTP) version 1.1, RFC 2616 (June 1999)". The SSL/TLS protocol's authentication mechanism typically requires an application serving Web pages to perform computationally expensive mathematical operations, the effects of which are fewer requests serviced per unit of time and higher latency in processing individual requests for Web pages.

The SSL/TLS protocol provides several methods to authenticate both parties to an SSL/TLS connection, the most common of which is the use of Rivest-Shamir-Adleman (RSA) authentication as part of a public key infrastructure (PKI). This is described in RSA Cryptography Standard, PKCS #1 Version 2.0, http://www.rsasecurity.com/rsalabs/pkcs/pkcs-1/index.html (Nov. 1, 1993). In common usage, applications serving Web pages will authenticate themselves to clients, but not vice-versa. As part of this procedure, the authenticating party performs a computationally expensive RSA "signing" operation in a full SSL/TLS handshake. This calculation can be time consuming and often comprises one of the largest bottlenecks for applications serving Web pages in relatively short-lived SSL/TLS connections.

DETAILED DESCRIPTION OF THE PREFERRED EMBODIMENT

Figure 1:
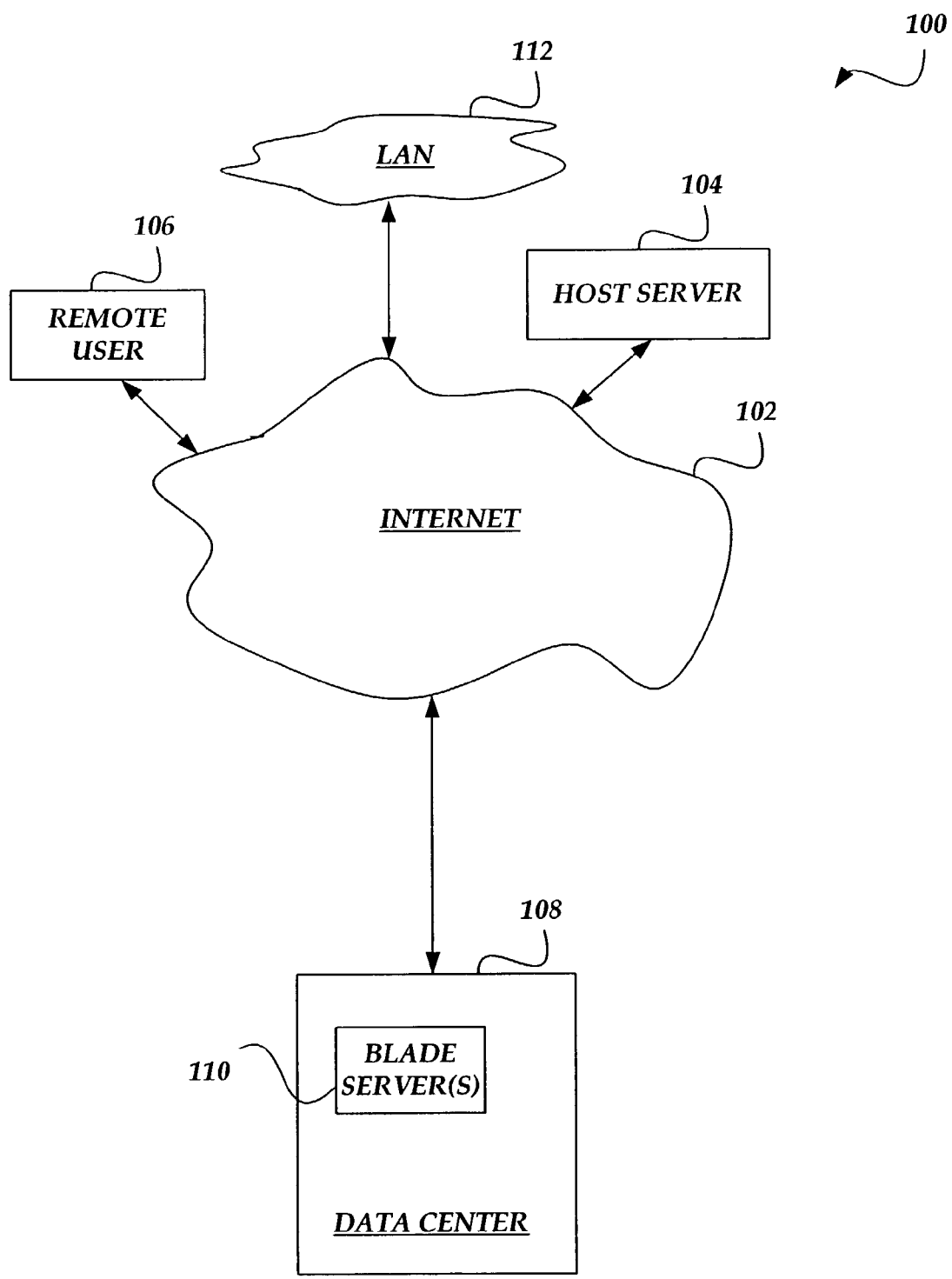
FIG. 1 shows a schematic overview of an exemplary environment for practicing the present invention.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise.

The term "accelerator" refers to a hardware device that is optimized for quickly performing specific cryptographic computations, e.g., modular exponentiation. The accelerator may be implemented in different types of hardware devices, including, but not limited to, PLD, FPGA, and the like.

The term "hard drive emulator" refers to a solid state media that appears to an application as a hard drive and provides substantially the same capacity and read/write speed as a hard drive. The hard drive emulator can be implemented with a variety of solid state media, including, but not limited to, Flash Memory, and the like.

The term "packet" refers to an IP packet. The term "flow" means a flow of packets. The term "connection" refers to a flow or flows of packets that share a common path.

The term "node" refers to a network element that interconnects one or more networks or devices.

The term "user" refers to any person or customer such as a business or organization that employs a device to communicate or access resources over a network.

The term "Blade Server" refers to a server that is provisioned on a single card that is typically clustered with other Blade Servers (multiple cards) in a single chassis or rack. Blade Servers are also sometimes referred to as high density, ultra-dense or hyper-dense solutions, where they are often employed for processing-light and transaction-heavy applications. Each Blade Server is typically dedicated to a single task or process, including, but not limited to, file sharing, Web page serving, caching, transcoding, streaming audio, streaming video, load balancing and failover management. A Blade Server usually includes its own operating system and an application to which it is dedicated.

To tightly package a Blade Server in a relatively small footprint (single card), the Blade Server will typically use a highly miniaturized and energy efficient Central Processing Unit (CPU) such as those employed in portable computing devices. Typically, rows of individual Blade Servers (which closely resemble the functionality of a motherboard) are in communication with each other over a commonly shared and relatively high-speed bus. In a chassis that is rack mountable, an exemplary Blade Server based solution can enable the operation of hundreds of CPUs within the confines of a relatively standard six-foot rack.

The term "network" refers to any packet switched digital network. For example, Frame Relay, Asynchronous Transfer Mode (ATM) and Switched Megabit Data Service, and the like.

Referring to the drawings, like numbers indicate like parts throughout the views. Additionally, a reference to the singular includes a reference to the plural unless otherwise stated or is inconsistent with the disclosure herein.

The present invention is a system and method in which a process or thread of execution for an application operates in a hard drive emulator in cooperation with a modified cryptographic toolkit, which off-loads portions of a cryptographic protocol to a hardware-based cryptographic accelerator. The hard drive emulator and cryptographic accelerator are integrated onto a single card. In one embodiment, the single card is a Blade Server that is configured to operate in a chassis.

The invention is described herein with reference to an SSL/TLS toolkit and the performance of cryptographic operations such as an RSA signing operation. It is to be understood that these references are exemplary in order to simplify the discussion, and that the invention can be practiced with other cryptographic operations and toolkits other than SSL/TLS toolkits.

The invention improves performance of RSA signing operations by implementing cryptographic acceleration in hardware. Typically, a hardware-based processor/accelerator for performing at least a portion of cryptographic operations can significantly improve performance as compared with performing all cryptographic operations in software. Overall latency in an application can be significantly reduced by at least an order of magnitude for modular exponentiation calculations when this type of calculation is performed in hardware. In this approach, software in an SSL/TLS-enabled application, such as an SSL/TLS proxy, Web Server, Traffic Manager, or Load Balancer, can make calls to the accelerator using an Application Programming Interface (API).

FIG. 1 shows components of an exemplary environment 100 in which the invention may be practiced. Not all the components may be required to practice the invention, and variations in the arrangement and type of the components may be made without departing from the spirit or scope of the invention. FIG. 1 illustrates a wide area network, such as Internet 102, that enables communication with remote user 106, host server 104, local area network (LAN) 112 and data center 108 where at least one Blade Server 110 is disposed. When the data center receives an incoming request, the request is provided to a Blade Server with an application dedicated to processing that particular type of request.

Figure 2:
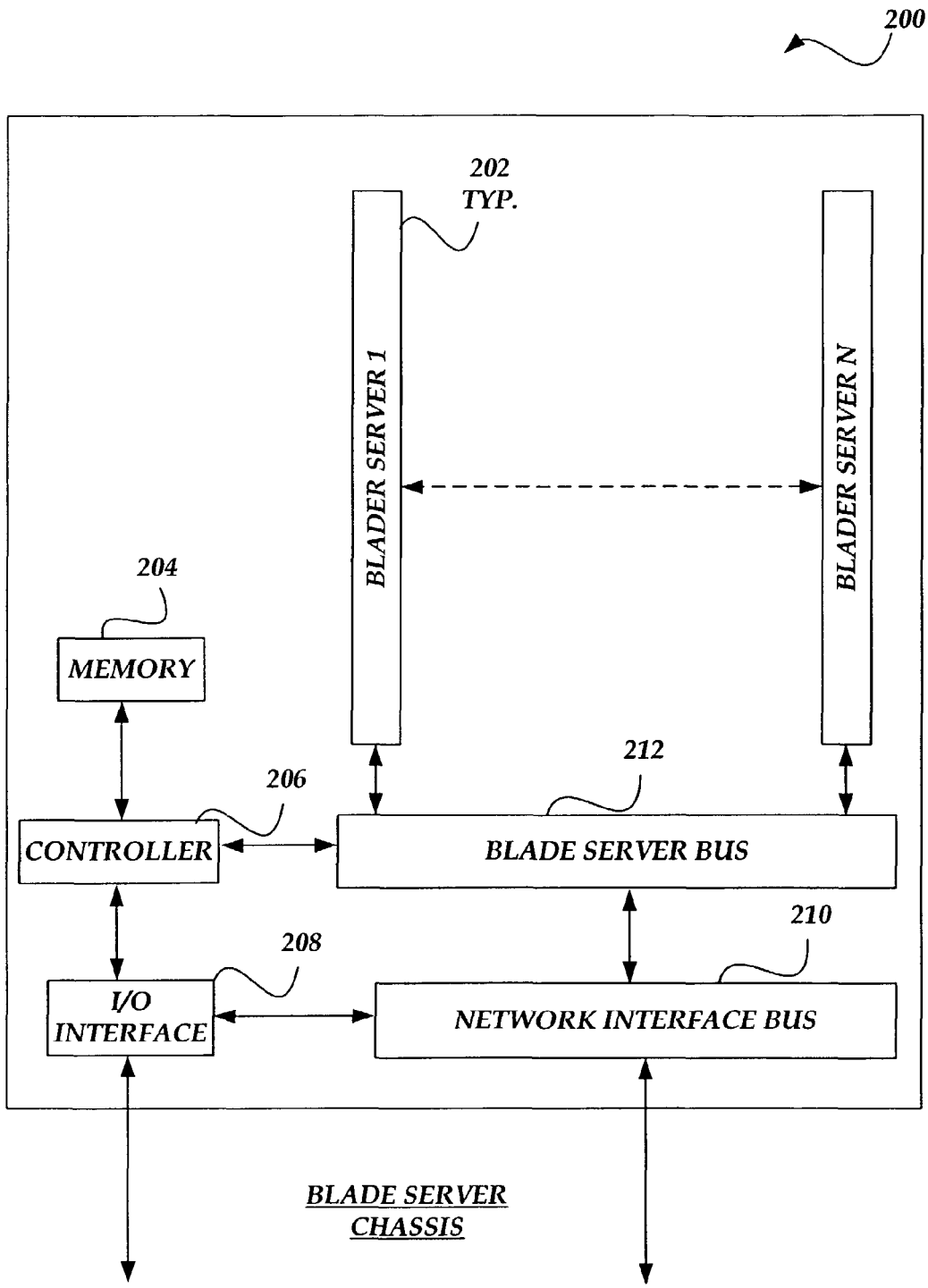
FIG. 2 illustrates a schematic overview of an exemplary chassis for enabling the operation of multiple Blade Servers.

FIG. 2 shows an overview of an exemplary blade server chassis 200 that includes controller 206 in communication with memory 204, Input/Output (I/O) interface 208, network interface bus 210 and blade server bus 212. Although not shown, bus 212 may include multiple slots for blade server cards 202. Also, bus 212 can be arranged to support anyone of several bus architectures, including, but not limited to, IDE, PCI, Industry Standard Architecture (ISA), Advanced Graphic Port (AGP), Firewire, Small Computer Serial Interface (SCSI), Universal Serial Bus (USB), and the like. However, in at least one embodiment, bus 212 supports an IDE architecture.

Figure 3:
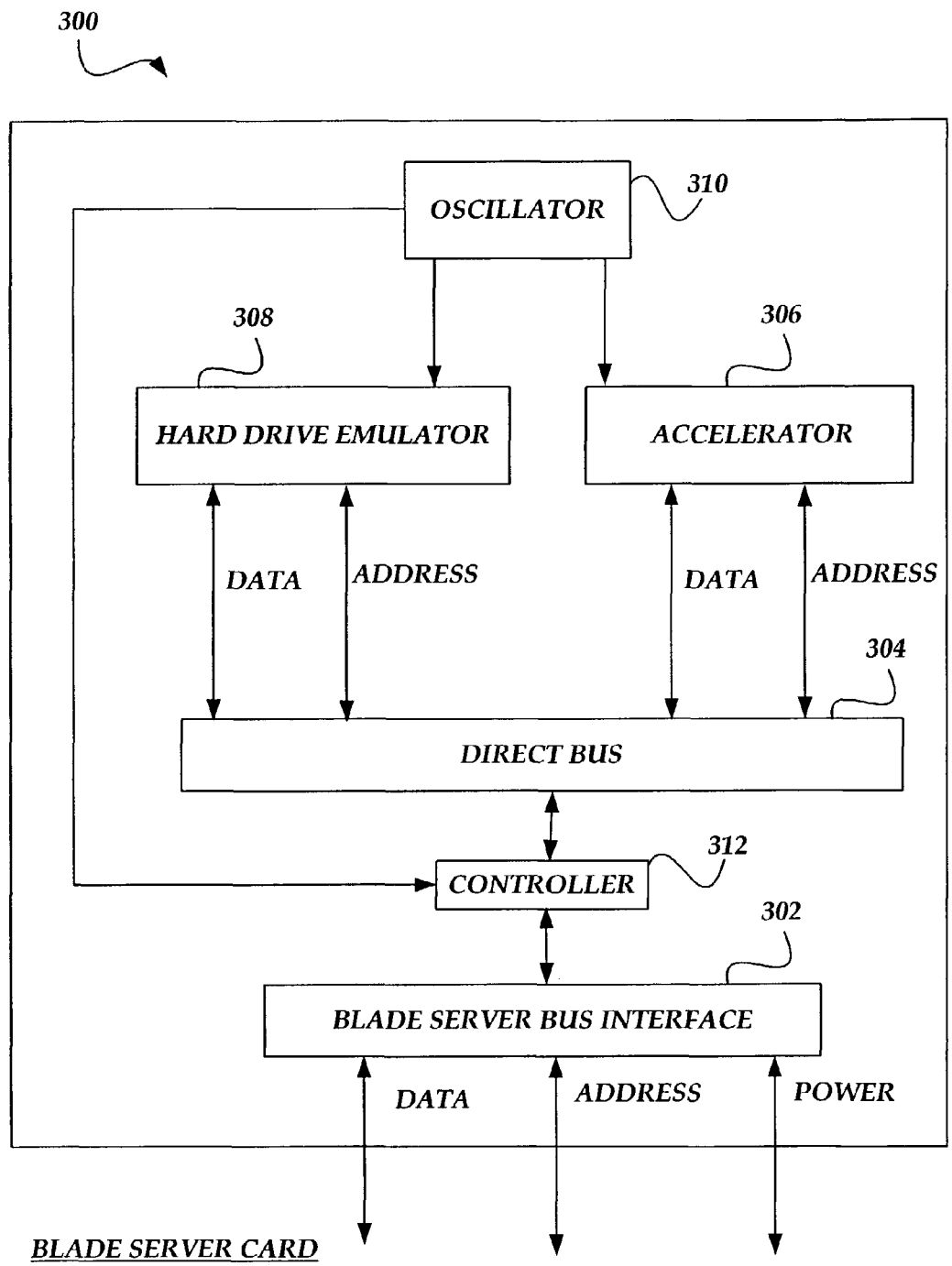
FIG. 3 shows a schematic overview of an exemplary card for enabling the operation of a Blade Server with a hard drive emulator and an accelerator for cryptographic functions.

FIG. 3 illustrates a schematic overview 300 of an exemplary card that is employable with a blade server. Controller 312 is coupled to direct bus 304, which enables communication of data and addresses with hard drive emulator 308 and accelerator 306. Almost all of an application may be stored in hard drive emulator 308 for relatively quick access by logical actions performed with controller 312. Direct bus 304 can employ a bus architecture, including, but not limited to, IDE, USB, ISA, PCI, AGP, SCSI, Firewire, Serial, and the like. However, since a relatively small amount of data is communicated between accelerator 306 and an application operating in controller 312 and hard drive emulator 308 (often 100 bytes or less), a relatively low speed bus architecture can be employed with direct bus 304.

Controller 312 is coupled to and enables communication over direct bus 304. Controller 312 is also coupled to blade server bus 302, which enables communication of data and addresses (as shown in FIG. 2). In one embodiment, blade server bus 302 receives power for blade server card 300 and operates as an IDE bus. Additionally, oscillator 310 is coupled to controller 312, hard drive emulator 308 and accelerator 306 to enable the synchronization of data and addresses communicated over direct bus 304.

Also, controller 312 may be provided in any one of several types of devices, including, but not limited to, CPU, microcontroller, Field Programmable Gate Array (FPGA) Programmable Logic Device (PLD), and the like.

Although not shown, controller 312 includes a driver, e.g., an IDE Master driver, to enable a solid state media, such as Compact Flash, to communicate with the application as hard drive emulator 308. Controller 312 can include another driver, e.g., an IDE Slave driver, that can enable either a blocking or non-blocking SSL driver to communicate with accelerator 306. Any of the IDE drivers can be implemented as a wrapper for a PCI driver. Also, the Slave IDE driver can operate as a wrapper for a PCI driver operating with accelerator 306. Additionally, the Master and Slave IDE drivers can enable the operation of the hard drive emulator 308 and accelerator 306 even if the blade server has just one (or none) IDE slot. Moreover, although space on a blade server is relatively constrained and only limited power is typically available, the highly integrated aspect of the invention enables the controller, accelerator and hard drive emulator to be located on the same blade server and consume relatively low power.

Figure 4:
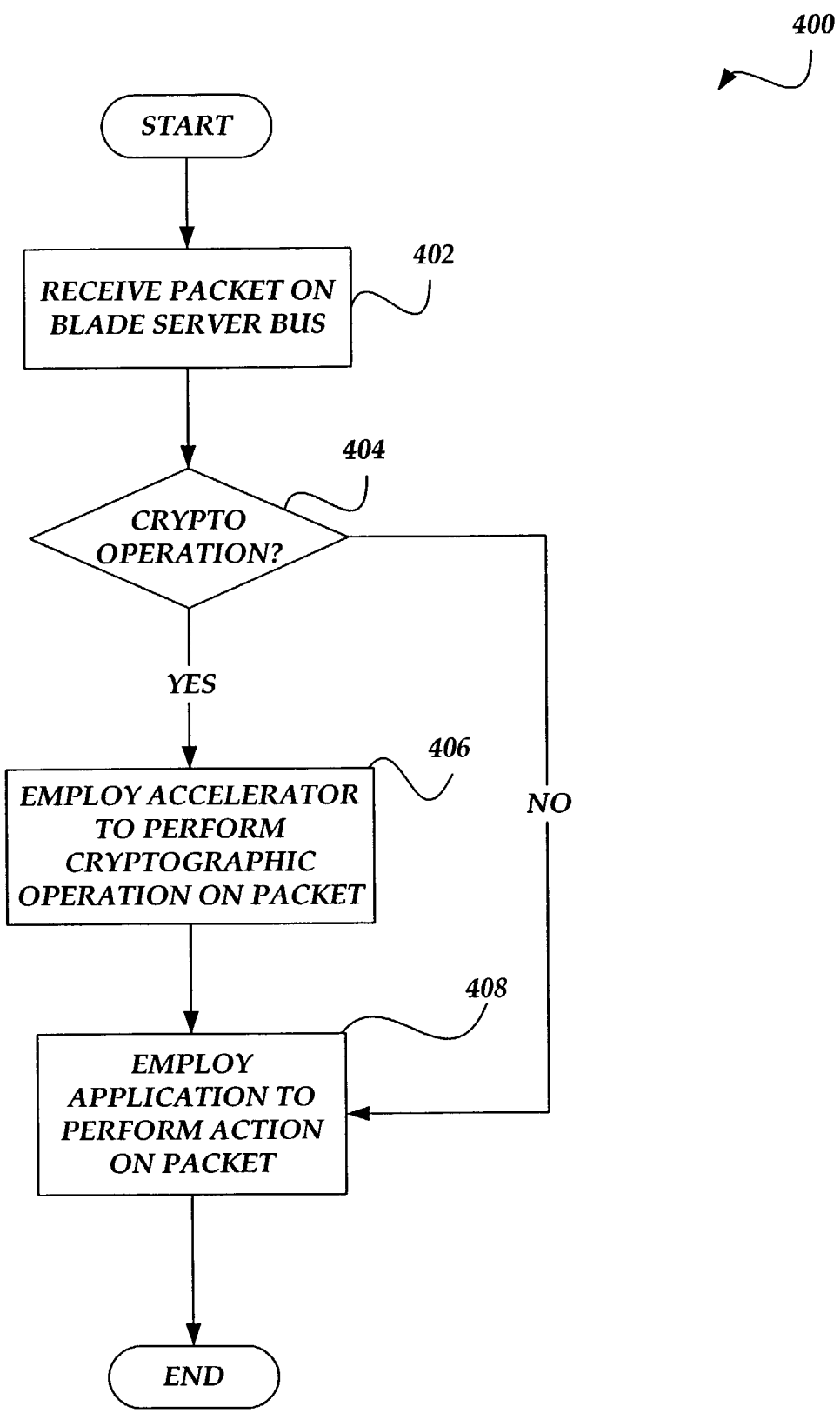
FIG. 4 illustrates a flow chart for an exemplary process to accelerate cryptographic functions for a Blade Server.

FIG. 4 is a flow chart illustrating an exemplary process for handling cryptographic functions with an accelerator. Moving from a start block, the process advances to block 402 where a packet is received on the blade server bus. At decision block 404, a determination is made as to whether a cryptographic operation needs to be performed on the packet, such as encrypt or decrypt information included with the packet. If not, the process flows to block 408 where an application performs at least one action based on the contents of the packet. Next, the process moves to an end block and returns to processing other actions.

Alternatively, if the determination at decision block 404 is affirmative (cryptographic operation to be performed on information included with the packet), the process moves to block 406 where a hardware-based accelerator is employed to perform at least one cryptographic calculation on information included with the packet. Depending on the type of cryptographic operation to be performed, the packet's information may be encrypted or decrypted. The process advances to block 408 and performs substantially the same actions discussed above. Lastly, the process moves to an end block where the process returns to processing other actions.

Figure 5:
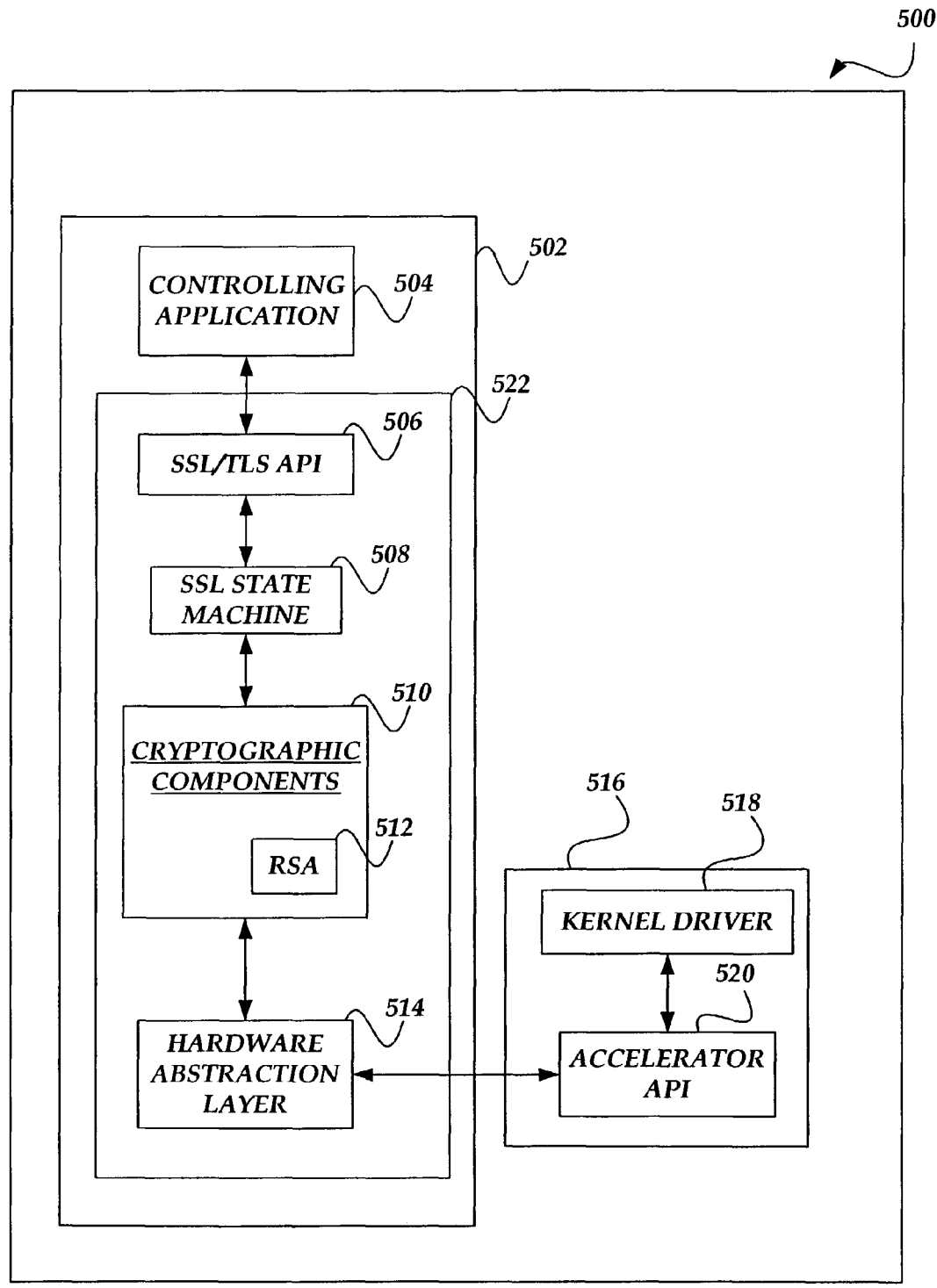
FIG. 5 shows an exemplary functional block overview of an SSL/TLS proxy for a Blade Server that off loads cryptographic functions to an accelerator, in accordance with the present invention.

FIG. 5 illustrates a schematic overview 500 of the logical components of SSL/TLS proxy server 502 configured to operate on a Blade Server and perform at least a portion of cryptographic operations (decryption/encryption) in a hardware-based accelerator. An SSL/TLS proxy is employed to alleviate the load on an SSL/TLS-enabled application, such as a Web Server, by stripping or "terminating" SSL/TLS from HTTPS (or any protocol fully encapsulated by SSL/TLS), and to centralize PKI key/certificate management. The SSL/TLS proxy 502 includes a controlling application 504 and an SSL/TLS cryptographic toolkit 522. The SSL/TLS cryptographic toolkit provides an SSL/TLS API 506, which is an interface used for communication between controlling application 504 and SSL/TLS cryptographic toolkit 522. SSL/TLS cryptographic toolkit 522 further includes an SSL/TLS state machine 508, cryptographic components 510, and a hardware abstraction layer. Cryptographic components 510 includes RSA module 512. The RSA module can perform RSA cryptographic computations in software. However, more complex cryptographic computations can also be off loaded to hardware-based accelerator 516 via hardware abstraction layer 514 for faster processing. Hardware-based accelerator 516 includes accelerator API 518 and kernel driver 520 for performing cryptographic computations, e.g., modular exponentiation and RSA signing.

SSL/TLS Cryptographic Toolkit 522 can perform different types of cryptographic operations concurrently. For example, controlling application 504 can request an RSA signing operation, an RSA verification operation, an RSA encryption operation, and an RSA decryption operation such that they all perform concurrently. The first operation requested is not necessarily the first operation completed. This is particularly advantageous when requesting a relatively fast operation such as RC4 decryption after a relatively slow operation such as RSA signing. Additionally, cryptographic requests involving different key sizes can be made concurrently. For example, controlling application 504 may request an RSA signing with a key size of 1024 bits followed by a request for an RSA signing with a key size of 512 bits. Since the latter operation takes longer than the former, the 512 bit signing may complete prior to the completion of the 1024 bit signing.

Also, while the invention is described herein in the context of an SSL/TLS proxy server, hardware based accelerator, and an SSL/TLS cryptographic toolkit, it may also be practiced with other cryptographic applications, and is not limited to those involving SSL/TLS. The invention enables various portions (or all) of an SSL/TLS protocol to be off-loaded to a hardware-based accelerator. Of course, the present invention could be applied to any SSL/TLS-enabled application using a cryptographic toolset capable of off-loading portions of the SSL/TLS protocol to a hardware-based accelerator.

Additionally, the invention described herein may be provided with the accelerator, application and controller on the same card, and with the hard disk emulator or some other storage device remotely located. In that case, the controller would provide an interface such as IDE to access and store information on a device remotely located from the card, e.g., a hard disk or Flash Memory disposed on another card in the chassis.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for a blade server, comprising:
   (a) a controller that enables the operation of an application;
   (b) a hardware-based accelerator that performs at least one cryptographic operation on a request provided by the application, wherein the accelerator provides the application with a result of a cryptographic operation;
   (c) a toolkit that enables determining whether to perform off-loading to the hardware-based accelerator of the at least one cryptographic operation based in part on a complexity of the cryptographic operation and providing results for a plurality of such requests provided by the application;
   (d) an integrated device electronics (IDE) interface that enables the application to communicate over a bus on a chassis, wherein at least a portion of the communication between the application and a resource includes information that is employed in the cryptographic operation; and
   (e) a card that is configured to operate as a server, wherein the card includes at least the accelerator, the controller, and a hard disk emulator that are in communication with each other over a direct bus on the card separate from the bus on the chassis, wherein the controller includes a master driver that enables communication over the direct bus between the application operating in the controller and the hard disk emulator and a slave driver that enables communication over the direct bus between the application operating in the controller and the accelerator, and wherein the controller is coupled between the direct bus and the IDE interface, wherein integrated operation of the application with the accelerator causes an increase in the performance of at least one cryptographic operation for the application.

2. The apparatus of claim 1, further comprising the hard disk emulator that enables the application to store and access data.

3. The apparatus of claim 2, wherein the hard disk emulator is a flash memory storage device.

4. The apparatus of claim 2, wherein the hard disk emulator further comprises a driver for enabling the application to access and store information with the hard disk emulator.

5. The apparatus of claim 2, wherein the hard disk emulator further comprises a driver for enabling the application to provide the request to the accelerator and receive the result.

6. The apparatus of claim 1, wherein the slave IDE driver operates as a wrapper for a PCI driver that operates with the accelerator.

7. The apparatus of claim 1, further comprising an oscillator that is configured to synchronize the actions of the accelerator and the application operating with the controller.

8. The apparatus of claim 1, wherein the bus is configured to operate with another interface, including at least one of PCI, SCSI, AGP, ISA, USB, FireWire, and Serial.

9. The apparatus of claim 1, wherein the accelerator is enabled to perform at least one of nodular exponentiation, and RSA signing.

10. The apparatus of claim 1, wherein the application enables the operation of at least one of a load balancer server, SSL/TLS proxy server, and Web Server.

11. The apparatus of claim 1, further comprising a slot on the chassis for enabling the operation of the card.

12. The apparatus of claim 1, wherein the chassis provides a single slot.

13. The apparatus of claim 1, further comprising another bus that is configured to enable communication between the resource and the chassis.

14. The apparatus of claim 13, wherein the other bus is configured to operate with another interface, including at least one of PCI, SCSI, AGP, ISA, USB, Firewire, and Serial.

15. The apparatus of claim 1, wherein the resource includes at least one of a client, node and another blade server.

16. The apparatus of claim 1, wherein the card is configured to enable the application to communicate over the bus with at least one of another blade server, client or node.

17. The apparatus of claim 1, wherein the toolkit is configured to enable determining whether to perform off-loading to the hardware-based accelerator of the at least one cryptographic operation based in part on a complexity of the cryptographic operation such that some SSL/TLS cryptographic operations are off-loaded and some SSL/TLS cryptographic operations are not off-loaded depending on how complex the SSL/TLS cryptographic operation is compared to other SSL/TLS cryptographic operations.

18. The apparatus of claim 1, wherein the toolkit is configured to enable determining whether to perform off-loading to the hardware-based accelerator of the at least one cryptographic operation based in part on a time complexity of the cryptographic operation such that if the time complexity of the cryptographic operation is greater than a threshold, the cryptographic operation is off-loaded to the hardware accelerator, and if the time complexity of the cryptographic operation is less than the threshold, the cryptographic operation is not off-loaded to the hardware accelerator.

19. A method for operating a blade server, comprising:
 (a) enabling at least one packet to be received over an integrated device electronics (IDE) bus on a card mounted in a chassis;
 (b) determining if at least one cryptographic operation is to be performed on information included with a received packet;
 (c) enabling a hardware-based accelerator to perform a cryptographic operation on information in the received packet;
 (d) providing a result of the cryptographic operation to an application, wherein integrated action between the application and the accelerator to perform the cryptographic operation enables an increase in the performance of the blade server; and
 (e) enabling a toolkit to concurrently process the cryptographic operation with another cryptographic operation and provide results for a plurality of such requests provided by the application, wherein the cryptographic operation may be performed concurrently in software or off-loaded to the hardware-based accelerator based in part on a complexity of the cryptographic operation
 (f) enabling the accelerator, a controller, and a hard disk emulator to be in communication with each other over a direct bus on the card separate from the IDE bus, wherein the controller includes a master driver that enables communication over the direct bus between the application operating in the controller and the hard disk emulator and a slave driver that enables communication over the direct bus between the application operating in the controller and the accelerator.

20. The method of claim 19, further comprises employing the accelerator to perform at least one of modular exponentiation, and RSA signing.

21. An apparatus, comprising:
 (a) a chassis with a plurality of slots; and
 (b) a plurality of blade servers, wherein each blade server is a card, each card of the plurality of cards including:
  (i) a hard disk emulator that enables an application to access and store information;
  (ii) a hardware-based accelerator that performs at least one cryptographic operation on a request provided by the application, wherein the accelerator is enabled to provide the application with a result of a cryptographic operation;
  (iii) a toolkit that enables completing the cryptographic operation before another cryptographic operation, concurrent with the other cryptographic operation, or after the other cryptographic operation and results for a plurality of such requests provided by the application, wherein the toolkit is configured to determine whether to complete the at least one cryptographic operation or to off-load the at least one cryptographic operation to the hardware-based accelerator based in part on a complexity of the cryptographic operation;
  (iv) an integrated device electronics (IDE) interface that is arranged for mounting the card in a corresponding slot of the plurality of slots, and enabling the application to communicate over a bus on the chassis, and enabling the integrated operation of the hard disk emulator and the accelerator, wherein the integrated operation of the hard disk emulator and accelerator enables an increase in the performance of at least one cryptographic operation performed for the application; and
  (v) a controller that enables the operation of the application;
  (vi) a direct bus that couples the accelerator, the controller, and the hard disk emulator to be in communication with each other, wherein the direct bus is separate from a bus on the chassis, and wherein the controller includes a master driver that enables communication over the direct bus between the application operating in the controller and the hard disk emulator and a slave driver that enables communication over the direct bus between the application operating in the controller and the accelerator.

22. The apparatus of claim 21, wherein the slave IDE driver is a wrapper for a PCI driver employed by the accelerator.

23. The apparatus of claim 21, wherein the controller is an FPGA.

* * * * *